(12) United States Patent  
Sung et al.

(10) Patent No.: US 12,275,305 B2  
(45) Date of Patent: Apr. 15, 2025

(54) DEVICE FOR CONTROLLING DISPLAYING OF CLUSTER FOR VEHICLE AND METHOD FOR DISPLAYING THE SAME

(71) Applicants: HYUNDAI MOTOR COMPANY, Seoul (KR); Kia Corporation, Seoul (KR)

(72) Inventors: Yu Kyoung Sung, Incheon (KR); Seung Yeon Jo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 297 days.

(21) Appl. No.: 17/899,987

(22) Filed: Aug. 31, 2022

(65) Prior Publication Data

US 2023/0234441 A1 Jul. 27, 2023

(30) Foreign Application Priority Data

Jan. 25, 2022 (KR) .................. 10-2022-0010918

(51) Int. Cl.
| | | |
|---|---|---|
| *B60K 35/00* | (2024.01) | |
| *B60K 35/10* | (2024.01) | |
| *B60K 35/28* | (2024.01) | |
| *B60K 35/29* | (2024.01) | |
| *B60K 35/81* | (2024.01) | |

(52) U.S. Cl.
CPC .............. *B60K 35/00* (2013.01); *B60K 35/10* (2024.01); *B60K 35/28* (2024.01); *B60K 35/29* (2024.01);

(Continued)

(58) Field of Classification Search
CPC ........ B60K 35/00; B60K 35/10; B60K 35/28; B60K 35/29; B60K 35/81;

(Continued)

(56) References Cited

U.S. PATENT DOCUMENTS 7,755,601 B2 7/2010 Yokota et al.
8,933,799 B2 1/2015 Katoh (Continued)

FOREIGN PATENT DOCUMENTS

JP H11-311545 A 11/1999
JP 4254719 B2 4/2009

(Continued)

*Primary Examiner* — Rodney A Butler
(74) *Attorney, Agent, or Firm* — MORGAN, LEWIS & BOCKIUS LLP

(57) ABSTRACT

A apparatus for controlling displaying of a cluster for a vehicle and a method for the same includes a communication apparatus to support communication with the vehicle cluster, and at least one processor operatively connected to the communication apparatus. The at least one processor is configured to generate screen data associated with a first event occurring during a first driving cycle of the vehicle, transmits the screen data to the cluster through the communication apparatus, displays, on a first area of a display provided in the cluster, an object corresponding to the first event, based on the screen data. The object corresponding to the first event is displayed at any one of a plurality of positions specified in the first area, in sequence in which the first event occurs.

20 Claims, 29 Drawing Sheets

(52) U.S. Cl.
CPC ........ *B60K 35/81* (2024.01); *B60K 2360/139* (2024.01); *B60K 2360/165* (2024.01); *B60K 2360/186* (2024.01)

(58) Field of Classification Search
CPC ........ B60K 2360/139; B60K 2360/165; B60K 2360/186; B60K 35/22; B60K 37/00; B60K 35/60; B60K 2360/16; B60K 2360/167; B60K 2360/171; B60K 2360/178; B60K 2360/18; B60K 2360/1868; B60K 2360/1876; B60K 35/80; B60K 35/85; B60K 2360/5899; B60R 16/023; B60R 16/0232; B60R 16/03; B60W 40/10; B60W 50/14; B60W 2050/0005; B60W 2050/009; B60W 2050/146
See application file for complete search history.

(56) References Cited

U.S. PATENT DOCUMENTS

| | | | |
|---|---|---|---|
| 11,117,468 | B2 | 9/2021 | Fujita et al. |
| 11,455,300 | B2 * | 9/2022 | Mehrotra ............... G06Q 50/04 |
| 2006/0092098 | A1 | 5/2006 | Yokota et al. |
| 2006/0181399 | A1 | 8/2006 | Sumiya |
| 2007/0030133 | A1 * | 2/2007 | Campbell ............. B60K 35/00 |
| | | | 340/438 |
| 2017/0168659 | A1 * | 6/2017 | Nam ...................... B60K 35/60 |
| 2019/0248240 | A1 | 8/2019 | Fujita et al. |

FOREIGN PATENT DOCUMENTS

| | | |
|---|---|---|
| JP | 4637546 B2 | 2/2011 |
| JP | 4867844 B2 | 2/2012 |
| KR | 10-2277852 B1 | 7/2021 |

\* cited by examiner

| 710 | 720 |
|---|---|
| WARNING LAMP HAVING FIXED POSITION | WARNING LAMP HAVING VARIABLE POSITIONS |
| ⬅ 🧍 ➡ | 🔧 ⚙ 💡 🔅 Ⓐ AUTO HOLD |

Fig.7

DEVICE FOR CONTROLLING DISPLAYING OF CLUSTER FOR VEHICLE AND METHOD FOR DISPLAYING THE SAME

CROSS-REFERENCE TO RELATED APPLICATION

The present application claims priority to Korean Patent Application No. 10-2022-0010918, filed on Jan. 25, 2022, the entire contents of which is incorporated herein for all purposes by this reference.

BACKGROUND OF THE PRESENT DISCLOSURE

Field of the Present Disclosure

The present disclosure relates to an apparatus configured for controlling displaying of a cluster for a vehicle, and a method for the same, and more relates to a technology of displaying information associated with the state of the vehicle to a cluster.

Description of Related Art

In general, a cluster is provided at a front portion of a driver seat of a vehicle to provide, to a driver, information on the driving of a vehicle, and operating states and warning messages of various devices inside the vehicle.

Recently, the cluster has been implemented in a form of a display, such as a liquid crystal display (LCD), to display various gauges or various indicators in a form of a graphic, an icon, a character, or a number. Furthermore, the cluster allows the driver to easily recognize the driving state by displaying information on the state of the vehicle or the guide/warning message of the vehicle on a display screen.

Meanwhile, as various and complex vehicle systems have been developed, an amount of information to be displayed to the cluster has been increased. The information for indicating the state of the vehicle system should be displayed based on regulations, productivity, and usability. Accordingly, an amount of information, which should essentially be displayed, has been increased.

Meanwhile, when the information on the state of the vehicle is fixedly displayed on many more parts of the display as an amount of information displayed on the cluster of the vehicle is increased, the efficiency in the use of the display may be degraded. Furthermore, because the same information is consecutively displayed at a fixed position, a screen burn-in phenomenon may be caused. Accordingly, there needs to develop a technology of improving the efficiency in the use of the display, which is more degraded, as the amount of the information displayed on the cluster is increased, and to overcome the screen burn-in phenomenon.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus configured for controlling displaying of a cluster for a vehicle and a method for the same, configured for improving the efficiency in the use of a large-scale display, which is degraded as more many portions of the display are used as areas for displaying information with the increase of the information displayed on a cluster.

Another aspect of the present disclosure provides an apparatus configured for controlling displaying of a cluster for a vehicle and a method for the same, configured for improving a screen burn-in phenomenon which is caused, as the same information is consecutively displayed at a fixed position of the cluster.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus configured for controlling displaying of a cluster for a vehicle may include a communication apparatus to support communication with a vehicle cluster, and at least one processor operatively connected to the communication apparatus. The at least one processor may generate screen data associated with a first event occurring during a first driving cycle of the vehicle, may transmit the screen data to the cluster through the communication apparatus, and may display, in a first area of a display provided in the cluster, an object corresponding to the first event, based on the screen data. The object corresponding to the first event may be displayed at any one of a plurality of positions specified in the first area, in sequence in which the first event occurs.

According to an exemplary embodiment of the present disclosure, the apparatus may further include a memory, and the at least one processor may store, in the memory, information on a position at which the object corresponding to the first event is displayed.

According to an exemplary embodiment of the present disclosure, the at least one processor may display, at any one of the plurality of positions specified, an object corresponding to a second event occurring during a second driving cycle next to the first driving cycle, based on the information stored in the memory.

According to an exemplary embodiment of the present disclosure, the at least one processor may display an object corresponding to the second event at a position the same as a position at which the object corresponding to the first event is displayed, when the second event is a same event as the first event, and may display the object corresponding to the second event at a position, which is different from the position at which the object corresponding to the first event is displayed, of the plurality of positions specified, in sequence in which the second event occurs, when the second event is different from the first event.

According to an exemplary embodiment of the present disclosure, the first area may include an upper central area of the display provided in the cluster.

According to an exemplary embodiment of the present disclosure, the plurality of positions specified in the first area may be previously determined based on a preset priority.

According to an exemplary embodiment of the present disclosure, the at least one processor may display, in a second area of the display, an object for indicating a system operating state of the vehicle, when power is supplied to the vehicle, and the second area may include a central area under the first area.

According to an exemplary embodiment of the present disclosure, the at least one processor may apply an animation to an object, which is to be maintained displayed, of the object for indicating the system operating state, after a predetermined time is elapsed from displaying of the object for indicating the system operating state in the second area, and may display the object to be maintained displayed at any one of the plurality of positions specified.

According to an exemplary embodiment of the present disclosure, the object corresponding to the first event may include at least one of information on a state of the vehicle or information on driving of the vehicle.

According to an exemplary embodiment of the present disclosure, the at least one processor may display the object corresponding to the predetermined event at the fixed position of the first area, regardless of the sequence in which a predetermined event occurs, when the predetermined event occurs.

According to another aspect of the present disclosure, a method for controlling displaying of a cluster for a vehicle may include generating, by at least one processor, screen data associated with a first event occurring during a first driving cycle of the vehicle, transmitting, by a communication apparatus, the screen data to the cluster for the vehicle, and displaying, by the at least one processor, in a first area of a display provided in the cluster, an object corresponding to the first event, based on the screen data. The object corresponding to the first event may be displayed at any one of a plurality of positions specified in the first area, in sequence in which the first event occurs.

According to an exemplary embodiment of the present disclosure, the method may storing, in the memory, information on a position at which the object corresponding to the first event is displayed, by the at least one processor.

According to an exemplary embodiment of the present disclosure, the method may further include displaying, at any one of the plurality of positions specified, an object corresponding to a second event occurring during a second driving cycle next to the first driving cycle, based on information stored in the memory, by the at least one processor.

According to an exemplary embodiment of the present disclosure, the displaying, at any one of the plurality of positions specified, the object corresponding to the second event occurring during the second driving cycle may include displaying an object corresponding to the second event at a position the same as a position at which the object corresponding to the first event is displayed, by the at least one processor, when the second event is a same event as the first event, and displaying the object corresponding to the second event at a position, which is different from the position at which the object corresponding to the first event is displayed, of the plurality of positions specified, in sequence in which the second event occurs, by the at least one processor, when the second event is different from the first event.

According to an exemplary embodiment of the present disclosure, the first area may include an upper central area of the display provided in the cluster.

According to an exemplary embodiment of the present disclosure, the plurality of positions specified in the first area may be previously determined based on a preset priority.

According to an exemplary embodiment of the present disclosure, the method may further include displaying, in a second area of the display, an object for indicating a system operating state of the vehicle, when power is supplied to the vehicle, by the at least one processor, and the second area may include a central area under the first area.

According to an exemplary embodiment of the present disclosure, the method may further include applying, by the at least one processor, an animation to an object, which is to be maintained displayed, of the object for indicating the system operating state, after a predetermined time is elapsed from displaying of the object for indicating the system operating state in the second area, and displaying the object to be maintained displayed at any one of the plurality of positions specified.

According to an exemplary embodiment of the present disclosure, the object corresponding to the first event may include at least one of information on a state of the vehicle or information on driving of the vehicle.

According to an exemplary embodiment of the present disclosure, the method may further include displaying, by the at least one processor, the object corresponding to a predetermined event at the fixed position of the first area, regardless of the sequence in which the predetermined event occurs, when the predetermined event occurs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7 is a view exemplarily illustrating an object displayed on a display provided in a cluster for a vehicle, in a device configured for controlling displaying of the cluster for the vehicle and a method for the same, according to an exemplary embodiment of the present disclosure;

Figure 1:
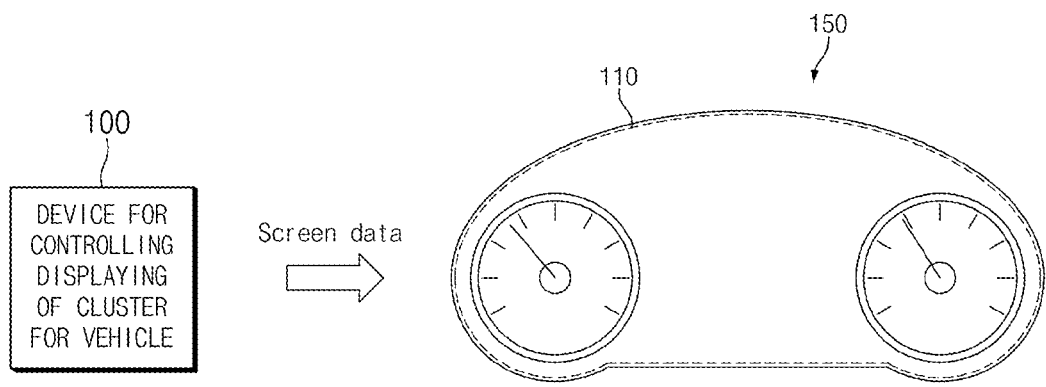
FIG. 1 is a view exemplarily illustrating a device configured for controlling displaying of a cluster for a vehicle, and the cluster, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to accompanying drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", "(a)", "(b)", and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Hereinafter, various embodiments of the present disclosure will be described with reference to FIGS. 1 to 13.

FIG. 1 is a view exemplarily illustrating a device (hereinafter, a display control device configured for a vehicle cluster) 100 for controlling displaying of a cluster for a vehicle and a cluster 150, according to an exemplary embodiment of the present disclosure.

Referring to FIG. 1, according to an exemplary embodiment of the present disclosure, a vehicle system for the display control device of the vehicle cluster may include the cluster 150 and the display control device 100 for the cluster 150 of the vehicle. Hereinafter, in the present disclosure, the display control device 100 for the cluster 150 of the vehicle may be simply referred to as the display control device 100.

According to an exemplary embodiment of the present disclosure, the display control device 100 may be implemented an internal portion or an external portion of the vehicle. In the instant case, the display control device 100 may be formed integrally with the internal control units of the vehicle or may be implemented with a separate hardware device and may be connected to control units of the vehicle through a connecting unit.

For example, the display control device 100 may be implemented integrally with the vehicle, or may be implemented in the form mounted on/attached to the vehicle separately from the vehicle. Alternatively, a portion of the display control device 100 may be implemented integrally with the vehicle, and another portion of the display control device 100 may be implemented in a form mounted on/attached to the vehicle separately from the vehicle. In the instant case, the display control device 100 may operate in connection to sensors of the vehicle, management systems to manage information of the vehicle, and/or the control systems.

According to an exemplary embodiment of the present disclosure, the cluster 150 may receive, from the display control device 100, screen data associated with an event occurring in the vehicle.

According to an exemplary embodiment of the present disclosure, the cluster 150 may include a display 110, and may display, on the display 110, an object corresponding to the event, based on the screen data received from the display control device 100. For example, the object corresponding to the event may include at least one of graphics, an icon, a character, or a number.

According to an exemplary embodiment of the present disclosure, the object displayed on the display 110 may include at least one of information on a state of the vehicle, information on driving of the vehicle, a notification, or a warning message.

According to an exemplary embodiment of the present disclosure, the display 110 may be implemented in various forms, such as a liquid crystal display (LCD), a thin film transistor-liquid crystal display (TFT LCD), and/or an organic light emitting diode (OLED).

According to an exemplary embodiment of the present disclosure, the display control device 100 may collect information on a driving situation of the vehicle, in connection to the sensors of the vehicle to sense the information on the vehicle, the management systems, and/or a driving control system. According to an exemplary embodiment of the present disclosure, the display control device 100 may monitor the collected information, and may generate screen data corresponding to an event occurring, when the event associated with the state of the vehicle, the driving of the vehicle, the failure of the vehicle, and/or a dangerous situation occurs.

As described above, according to an exemplary embodiment of the present disclosure, the display control device 100 may transmit the screen data associated with the event to the cluster 150, and may perform a control operation to display, on the display 110 provided in the cluster 150, an object corresponding to the event, based on the screen data so that the driver rapidly recognizes the failure of the vehicle and/or the dangerous situation.

Figure 2:
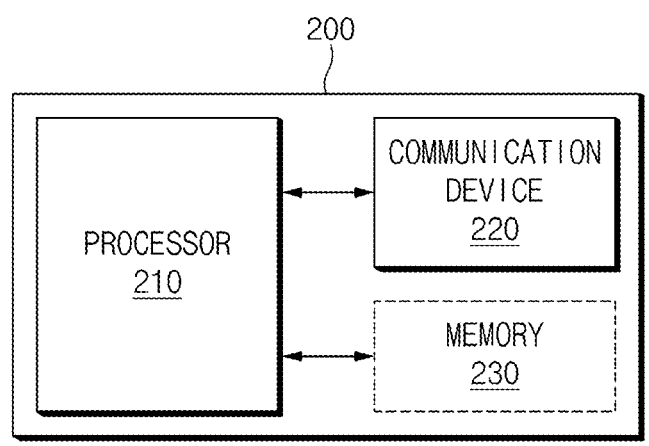
FIG. 2 is a block diagram illustrating a device configured for controlling displaying of a cluster for a vehicle, according to an exemplary embodiment of the present disclosure.

FIG. 2 is a block diagram of a display control device 200 of the vehicle cluster, according to an exemplary embodiment of the present disclosure.

Referring to FIG. 2, according to an exemplary embodiment of the present disclosure, the display control device 200 may include a processor 210, a communication device 220, and a memory 230. According to various exemplary embodiments of the present disclosure, the display control device 200 may further include an additional component or at least one of the components illustrated in FIG. 2, in addition to the components illustrated in FIG. 2.

The processor 210 may be, for example, an electronic control unit (ECU), a micro controller unit (MCU), or another lower-level controller mounted in a vehicle.

According to an exemplary embodiment of the present disclosure, the processor 210 may perform data processing or an operation associated with a control and/or a communication of at least one other component(s) of the display control device 200 by use of instructions stored in the memory 230.

According to an exemplary embodiment of the present disclosure, the processor 210 may control one or more objects on the state of the vehicle, which are displayed on a display of a cluster (e.g., the cluster 150 of FIG. 1). In detail, the processor 210 may control one or more objects associated with the state of the vehicle, which are displayed on the display, based on screen data.

According to an exemplary embodiment of the present disclosure, the communication device 220 may receive information from various sensors or various systems to collect information on the state of the vehicle or the information on the driving of the vehicle.

According to an exemplary embodiment of the present disclosure, the communication device 220 may transmit screen data associated with an event occurring in the vehicle, to the cluster.

In the instant case, the communication device 220 may include a communication module to support vehicle network communication such as controller area network (CAN) communication, Local Interconnect Network (LIN) communication and/or flex-ray communication.

According to an exemplary embodiment of the present disclosure, the memory 230 may store data and/or algorithms necessary for the display control device 200 to operate.

According to an exemplary embodiment of the present disclosure, the memory 230 may store information received from various sensors or various systems to collect information on the state of the vehicle or the information on the driving of the vehicle. For example, the memory 230 may store information detected from an ultrasonic sensor and various sensors of a scanner and/or a camera, and may store information received from at least one vehicle managing system, such as a battery managing system, a lane departure warning system, and/or a collision warning system, and/or a control system.

According to an exemplary embodiment of the present disclosure, the memory 230 may store information associated with an event previously defined, and may store information the lay-out of screen data corresponding to each event.

According to an exemplary embodiment of the present disclosure, the memory 230 may store information on a position of an object displayed on the display of a cluster.

In the instant case, the memory 230 may include a storage medium, such as a random access memory (RAM), a static random access memory (SRAM), a read-only memory (ROM), a programmable read-only memory (PROM), and/or an electrically erasable programmable read-only memory (EEPROM).

Figure 3:
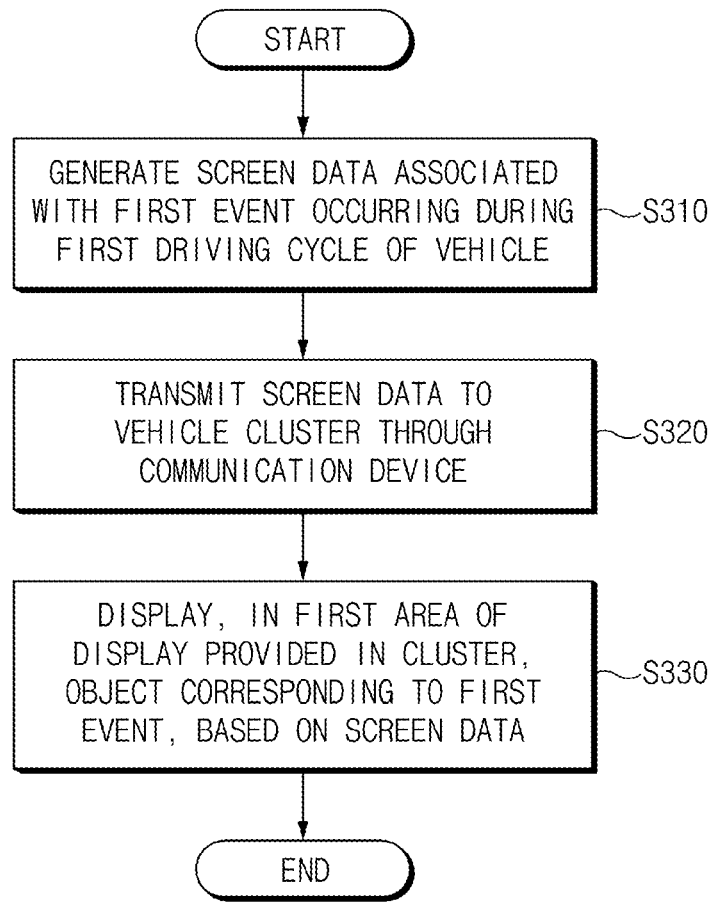
FIG. 3 is a flowchart illustrating a method for controlling displaying a cluster for a vehicle, according to an exemplary embodiment of the present disclosure.

FIG. 3 is a flowchart illustrating a method for controlling displaying a cluster for a vehicle, according to an exemplary embodiment of the present disclosure. According to an exemplary embodiment of the present disclosure, hereinafter, operations of S310 to S330 may be sequentially performed, but not necessarily performed sequentially. For example, the sequence of the operations may be changed, or at least two operations may be performed in parallel.

Referring to FIG. 3, in the display control device of the vehicle cluster and the method for the same, according to an exemplary embodiment of the present disclosure, a processor (e.g., the processor 210 of FIG. 2) may generate screen data associated with a first event occurring during the first driving cycle of the vehicle (S310).

According to an exemplary embodiment of the present disclosure, the processor may collect the information on the state of the vehicle and/or the information on the driving of the vehicle from sensors to detect vehicle information, a vehicle managing system, and/or a driving control system.

According to an exemplary embodiment of the present disclosure, the display control device may monitor the collected information, and may generate screen data corresponding to an event occurring, when the event associated with the state of the vehicle, the driving of the vehicle, the failure of the vehicle, and/or a dangerous situation occurs.

According to an exemplary embodiment of the present disclosure, the processor is configured to transmit the screen data to the vehicle cluster through a communication device (e.g., the communication device 220 of FIG. 2) (S320). For example, the screen data may include data necessary for notify a driver of the state of the vehicle through the display provided in the cluster.

According to an exemplary embodiment of the present disclosure, the processor may convert the generated screen data to be in an output form of the cluster and may transmit the converted result to the cluster.

According to an exemplary embodiment of the present disclosure, the processor may display, on a first area of a display provided in the cluster, an object corresponding to the first event, based on the screen data (S330).

According to an exemplary embodiment of the present disclosure, the first area may include an upper central area of the display included in the cluster.

According to an exemplary embodiment of the present disclosure, the processor may display an event including at least one of graphics, an icon, a character, or a number, based on the screen data transmitted to the cluster.

According to an exemplary embodiment of the present disclosure, the object corresponding to the first event may be displayed at any one of a plurality of positions specified in the first area, in sequence in which the first event occurs.

According to an exemplary embodiment of the present disclosure, the plurality of positions may be previously specified or allocated for the first area. For example, the plurality of positions may be arranged left and right based on the upper central area of the display 110.

According to an exemplary embodiment of the present disclosure, each of the positions specified in the first area may be previously determined based on a preset priority. According to an exemplary embodiment of the present disclosure, each of the specified positions may be specified to have a higher priority toward the center portion of the upper area of the display 110.

According to an exemplary embodiment of the present disclosure, the object corresponding to the event may be sequentially displayed at the plurality of specified positions while first displayed at a position, which has a higher priority, of the plurality of specified positions, based on the sequence in which the event occurs. For example, an object corresponding to an event earlier occurring may be displayed at an area closer to the center portion of the upper area of the display 110, as compared to an object corresponding to an event later occurring.

Figure 4:
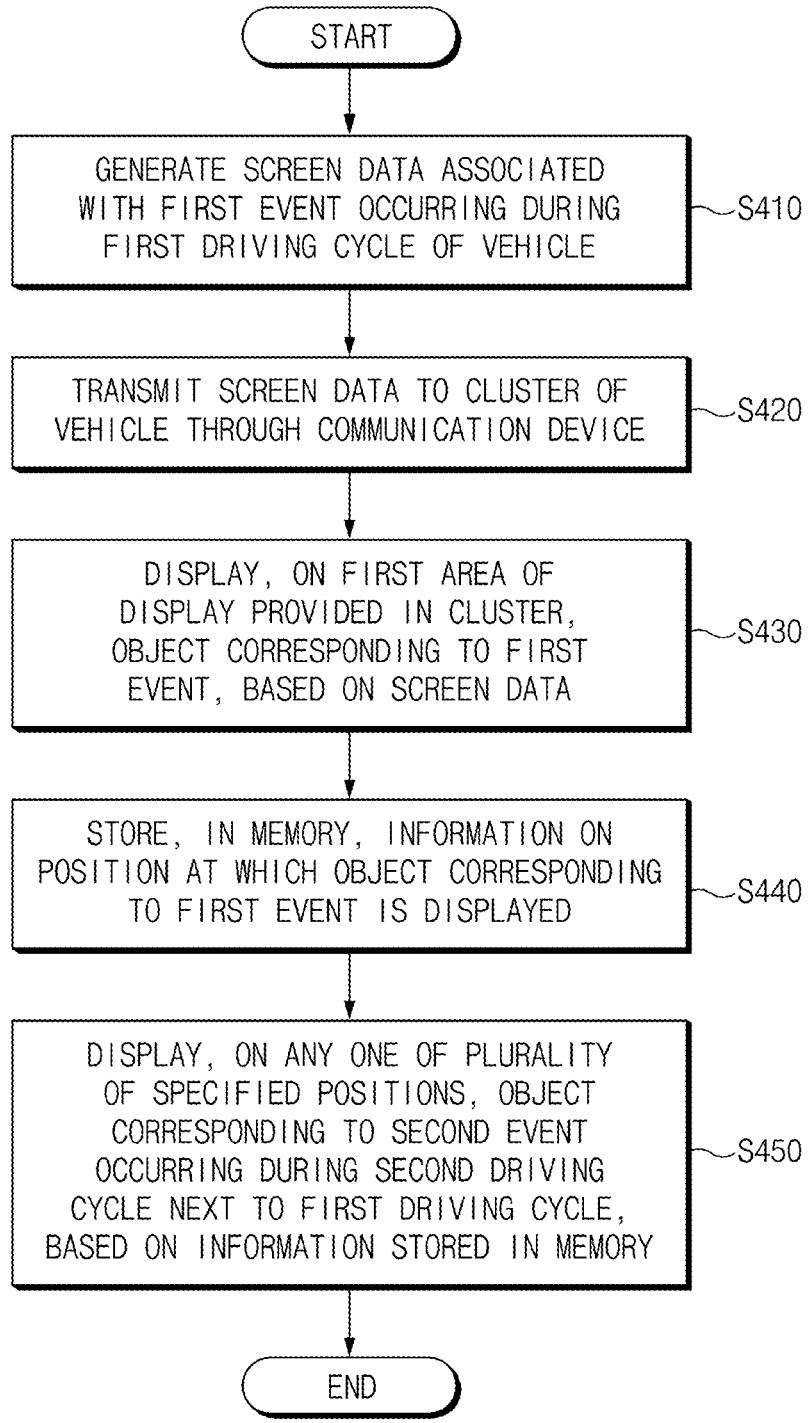
FIG. 4 is a flowchart illustrating a control operation for displaying of a cluster during a first driving cycle and a second driving cycle in a device configured for controlling displaying of a cluster for a vehicle, according to an exemplary embodiment of the present disclosure.

FIG. 4 is a flowchart illustrating a control operation for displaying of a cluster during a first driving cycle and a second driving cycle in a display control device of a vehicle cluster according to an exemplary embodiment of the present disclosure. In the following description to be made with reference to FIG. 4, the description of S410 to S430 is the duplication of the above description made with reference to FIG. 3, so that the description of S410 to S430 may be understood by making reference to the description made with reference to FIG. 3.

Referring to FIG. 4, in the display control device of the vehicle cluster and the method for the same, according to an exemplary embodiment of the present disclosure, the processor may generate screen data associated with a first event occurring during the first driving cycle of the vehicle (S410).

According to an exemplary embodiment of the present disclosure, the processor is configured to transmit the screen data to the vehicle cluster through a communication device (S240).

According to an exemplary embodiment of the present disclosure, the processor may display, on a first area of a display provided in the cluster, an object corresponding to the first event, based on the screen data (S430).

According to an exemplary embodiment of the present disclosure, the processor may store, in the memory, information on a position at which the object corresponding to the first event is displayed (S440).

According to an exemplary embodiment of the present disclosure, the processor may store, in the memory, information on a position, at which the object corresponding to the first event is displayed, of the plurality of positions specified in the first area.

According to an exemplary embodiment of the present disclosure, the processor may display, on any one of the plurality of specified positions, an object corresponding to a second event occurring during a second driving cycle next to the first driving cycle, based on the information stored in the memory (S450).

According to an exemplary embodiment of the present disclosure, the processor may display the object corresponding to the second event at a position the same as a position at which the object corresponding to the first event is displayed, based on the information on the position at which the object corresponding to the first event is displayed, which is stored in the memory, when the second event is the same event as the first event, According to an exemplary embodiment of the present disclosure, the processor may display the object corresponding to the second event at a position, which is different from the position at which the object corresponding to the first event is displayed, based on the information on the position at which the object corresponding to the first event is displayed, which is stored in the memory, when the second event is different from the first event. In the instant case, the object corresponding to the second event may be first displayed at a position, which is set to have a higher priority, of the plurality of positions specified in the first area, except for the position at which the object corresponding to the first event is displayed FIG. 5 is a view exemplarily illustrating information displayed on a display provided in a vehicle cluster in a display control device of the vehicle cluster and a method for the same, according to an exemplary embodiment of the present disclosure.

Figure 5:
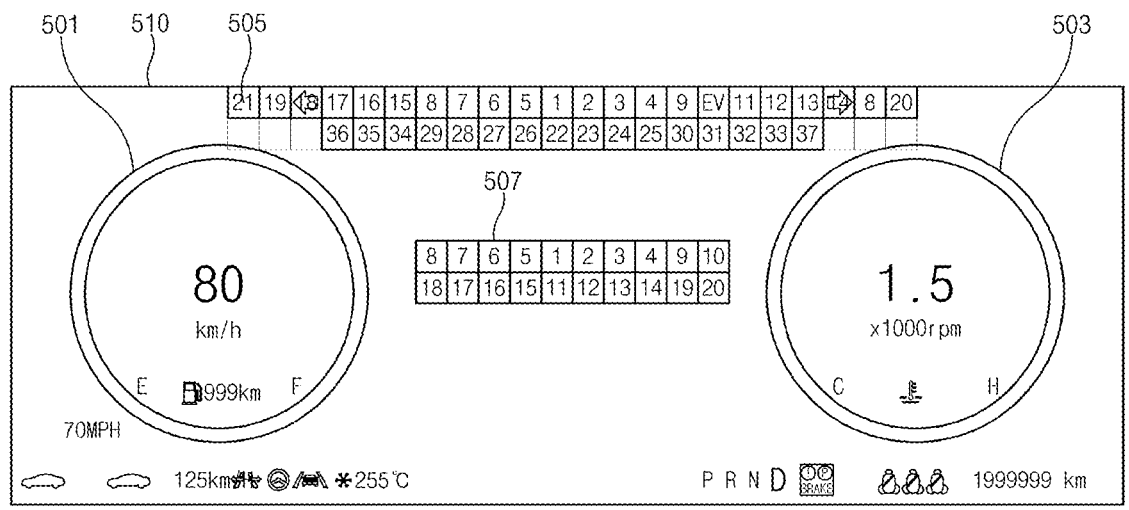
FIG. 5 is a view exemplarily illustrating information displayed on a display provided in a cluster for a vehicle, in a device configured for controlling displaying of a cluster for a vehicle and a method for the same, according to an exemplary embodiment of the present disclosure.

Referring to FIG. 5, in the display control device of the vehicle cluster and the method for the same, according to an exemplary embodiment of the present disclosure, a processor may display a speedometer 501 and a tachometer 503 on a display 510, and may display information on the state of the vehicle in a first area 505 and a second area 507.

According to an exemplary embodiment of the present disclosure, the speedometer 501 may indicate a vehicle speed, and the tachometer 503 may indicate revolutions per minute (RPM) of an engine.

According to an exemplary embodiment of the present disclosure, the first area 505 may include an upper central area of the display 510.

According to an exemplary embodiment of the present disclosure, the processor may display an object for indicating the state of the vehicle or the state of the driving of the vehicle in the first area 505 of the display 510. For example, when an event associated with the failure of the vehicle and/or the dangerous situation of the vehicle occurs, the object for indicating the failure of the vehicle and/or the dangerous situation of the vehicle may be displayed in the first area 505. Furthermore, for example, the object for indicating the information on the state of the vehicle or the information on the driving of the vehicle may be displayed in the first area 505.

According to an exemplary embodiment of the present disclosure, a position for displaying the object for indicating the information on the state of the vehicle or the information on the driving of the vehicle may be specified or allocated in the first area 505 by the number of the object. For example, the plurality of positions may be arranged left and right based on the upper central area of the display 510.

According to an exemplary embodiment of the present disclosure, the processor may previously set an object, which should be displayed at a fixed position in compliance with a relevant regulation, to be displayed on at least one position of the plurality of positions specified in the first area 505.

According to an exemplary embodiment of the present disclosure, the second area 507 may include the central area of the display 510. According to an exemplary embodiment of the present disclosure, the second area 507 may include the central area under the first area 505.

According to an exemplary embodiment of the present disclosure, the processor may display an object for indicating the operating state of a system in the second area 507, when power is supplied to the vehicle. In detail, the processor may display the object for indicating the operating state of the system, in the second area 507 to inspect the sensors to detect vehicle information, the vehicle managing system, and/or the driving control system, when the power is supplied to the vehicle.

Figure 6:
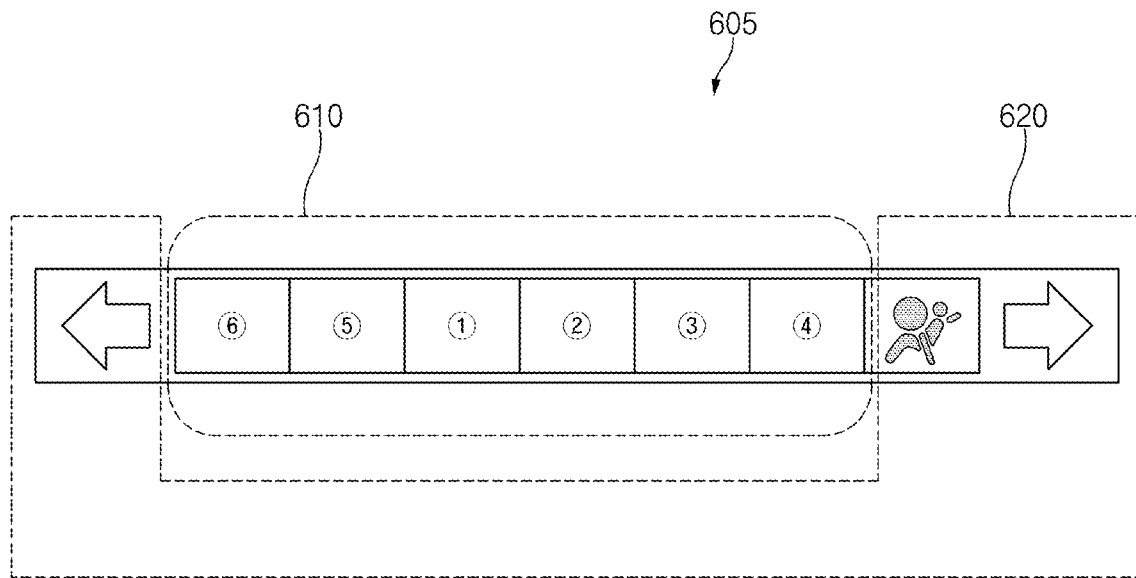
FIG. 6 is a view exemplarily illustrating a first area of a display provided in a cluster for a vehicle, in a device configured for controlling displaying of the cluster for the vehicle and a method for the same, according to an exemplary embodiment of the present disclosure.

FIG. 6 is a view exemplarily illustrating a first area of a display provided in a vehicle cluster, in a display control device of the vehicle cluster and a method for the same, according to an exemplary embodiment of the present disclosure.

Referring to FIG. 6, according to an exemplary embodiment of the present disclosure, a first area 605 may be placed in at least a partial area of a display provided in the vehicle cluster. According to an exemplary embodiment of the present disclosure, the first area 605 may include an upper central area of the display 510.

According to an exemplary embodiment of the present disclosure, the processor may display, in the first area 605, an object corresponding to at least one event occurring in association with the state of the vehicle, the driving of the vehicle, the vehicle failure, and/or the dangerous situation of the vehicle.

According to an exemplary embodiment of the present disclosure, the first area 605 may include a third area 610 for displaying an object corresponding to an event in the sequence in which the event occurs, and a fourth area 620 for displaying an object corresponding to an event regardless of the sequence in which the event occurs.

According to an exemplary embodiment of the present disclosure, the processor may specify or allocate a plurality of positions for the third area 610, based on a predetermined priority. For example, each of the positions may be specified to have a higher priority toward the center portion of the upper area of the display.

According to an exemplary embodiment of the present disclosure, the processor may display the object corresponding to the event at the third area 610, from a position including a higher priority, based on the sequence in which the event occurs. For example, the first object corresponding to the first event may be displayed at a position closer to the center portion of the upper area of the display, as compared to the second object corresponding to an event occurring after the first event.

According to an exemplary embodiment of the present disclosure, when a specific event occurs, an object corresponding to the specific event may be displayed at the fourth area 620, regardless of the sequence in which the event occurs. For example, the object corresponding to the specific event may include an object which may be displayed at a fixed position in compliance with a relevant regulation.

FIG. 7 is a view exemplarily illustrating an object displayed on a display provided in a vehicle cluster, in a display control device of the vehicle cluster and a method for the same, according to an exemplary embodiment of the present disclosure.

Referring to FIG. 7, according to an exemplary embodiment of the present disclosure, a first-type object 710 may be displayed at a fixed position of a display area, regardless of the sequence in which an event occurs.

According to an exemplary embodiment of the present disclosure, the first-type object 710 may include an object, which should be displayed at a fixed position in compliance with a relevant regulation, of the information on the state of the vehicle or the information on the driving of the vehicle. For example, the first-type object 710 may include a direction indicator and an airbag warning light.

According to an exemplary embodiment of the present disclosure, a second-type object 720 may be varied in position thereof displayed at the display area, depending on the sequence in which an event occurs.

According to an exemplary embodiment of the present disclosure, the second-type object 720 may include at least one of the information on the state of the vehicle or the information on the driving of the vehicle.

According to an exemplary embodiment of the present disclosure, the second-type object 720 may indicate that a dangerous factor is present in the vehicle, that the inspection for the vehicle is required, or the simple state of the vehicle.

For example, the second-type object 720 may include at least one of engine/emissions warning, dipped beam headlights, displaying of a taillight, an idle restriction system, an auto hold, and/or a brake warning.

FIGS. 8A to 8H are views exemplarily illustrating that an object, which corresponds to an event occurring during a first driving cycle is displayed on a display provided in a vehicle cluster, in a display control device of the vehicle cluster and a method for the same, according to an exemplary embodiment of the present disclosure.

Referring to FIGS. 8A to 8H, a first area 805 may be placed in at least a partial area of a display provided in a cluster. For example, the first area 805 may include an upper central area of the display. According to an exemplary embodiment of the present disclosure, the object for indicating the information on the state of the vehicle or the information on the driving of the vehicle may be displayed in the first area 805.

According to an exemplary embodiment of the present disclosure, the processor may store, in the memory, information on a position, at which the object is displayed, when the object for indicating the information on the state of the vehicle or the information on the driving of the vehicle is displayed in the first area 805.

According to an exemplary embodiment of the present disclosure, when the event occurs during the first driving cycle and the object corresponding to the event is displayed in the first area 805, the processor may display the object based on the information on the position stored in the memory.

Figure 8A:
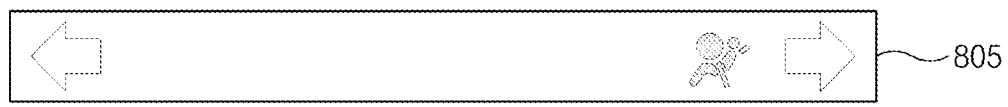
FIG. 8A, FIG. 8B, FIG. 8C, FIG. 8D, FIG. 8E, FIG. 8F, FIG. 8G and FIG. 8H are views exemplarily illustrating that an object, which corresponds to an event occurring during a first driving cycle, is displayed on a display provided in a cluster for a vehicle, in a device configured for controlling displaying of the cluster for the vehicle and a method for the same, according to an exemplary embodiment of the present disclosure.

Referring to FIG. 8A, according to an exemplary embodiment of the present disclosure, in the display control device of the vehicle cluster and the method for the same, when there is no object displayed at least one time during a right-before driving cycle, the processor may initialize information on a position in which the object is displayed in the first area 805, during the present driving cycle. In detail, when there is absent an object displayed in the first area 805 during the right-before cycle, the processor may display the object at the plurality of positions specified in the first area 805, depending on sequence in which an event occurs, regardless of the right-before driving cycle.

Figure 8B:
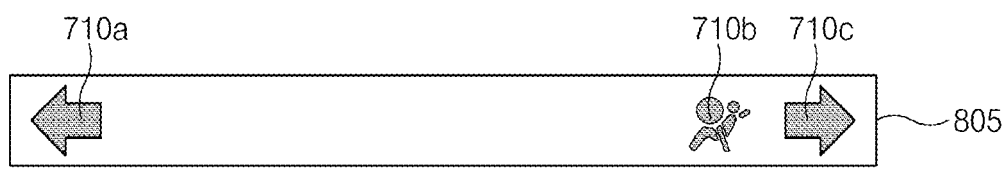

Referring to FIG. 8B, according to an exemplary embodiment of the present disclosure, the processor may display the object corresponding to the specific event at a fixed area of the first area 805, regardless of the sequence in which the event occurs.

According to an exemplary embodiment of the present disclosure, the object corresponding to the specific event may include an object (e.g., a first object 710*a*, a second object 710*b*, and a third object 710*c*), which may be displayed at a specified position of the display in compliance with a relevant regulation.

For example, when the information corresponding to the first object 710*a* is determined to be displayed, the processor may display the first object 710*a* at a first fixed position of the first area 805. For example, when the information corresponding to the second object 710*b* is determined to be displayed, the processor may display the second object 710*b* at a second fixed position of the first area 805. For example, when the information corresponding to the third object 710*c* is determined to be displayed, the processor may display the third object 710*c* at a third fixed position of the first area 805.

Figure 8C:
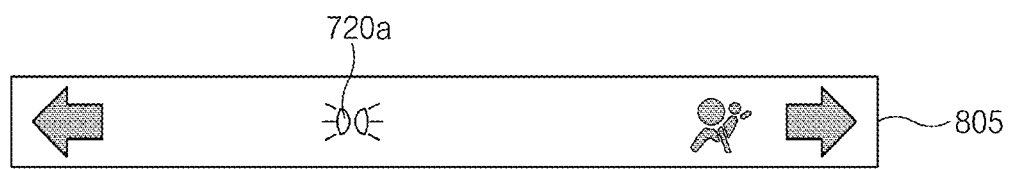

Referring to FIG. 8C, according to an exemplary embodiment of the present disclosure, in the display control device of the vehicle cluster and the method for the same, when an event corresponding to a fourth object 720*a* is determined as occurring, the processor may display the fourth object 720*a* at a position, which is set to have the highest priority, of a plurality of positions specified in the first area 805.

According to an exemplary embodiment of the present disclosure, the processor may store, in the memory, information on a position at which the fourth object 720*a* is displayed. For example, the information on the position, at which the fourth object 720*a* is displayed, may include information on a position, which is allocated or specified in the fourth object 720*a*, of the plurality of positions specified in the first area 805.

Figure 8D:
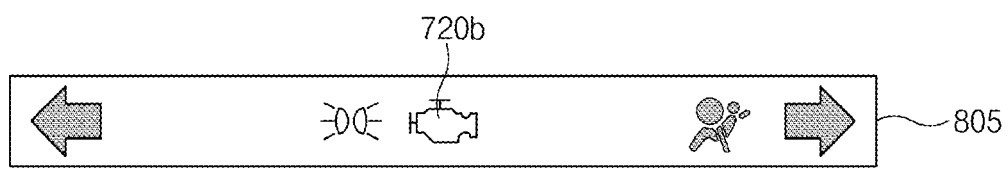

Referring to FIG. 8D, according to an exemplary embodiment of the present disclosure, in the display control device of the vehicle cluster and the method for the same, when an event corresponding to a fifth object 720*b* is determined as occurring, the processor may display the fifth object 720*b* at a position, which is set to have the second highest priority, of the plurality of positions specified in the first area 805.

According to an exemplary embodiment of the present disclosure, when it is determined that the fourth object 720*a* is to be maintained displayed, the processor may display the fifth object 720*b* at a position, which is set to have the second highest priority, of the plurality of positions specified in the first area 805, in the state that the fourth object 720*a* is displayed.

According to an exemplary embodiment of the present disclosure, the processor may store, in the memory, information on a position at which the fifth object 720*b* is displayed. For example, the information on the position, at which the fifth object 720*b* is displayed, may include information on a position, which is allocated or specified for the fifth object 720*b*, of the plurality of positions specified in the first area 805.

Figure 8E:
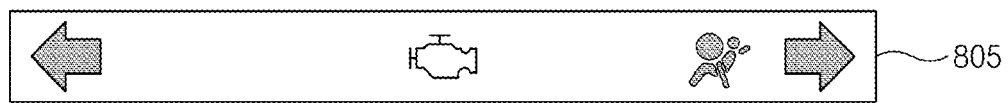

Referring to FIG. 8E, according to an exemplary embodiment of the present disclosure, in the display control device of the vehicle cluster and the method for the same, when it is determined that the displaying of the fourth object 720*a* is released or the fourth object 720*a* displayed is deleted, the processor may release the displaying of the fourth object 720*a* in the first area 805 or may delete the fourth object 720*a* displayed from the first area 805.

For example, the processor may release the displaying of the fourth object 720*a* in the first area 805 or delete the fourth object 720*a* displayed from the first area 805, when it is determined that the event corresponding to the fourth object 720*a* is terminated, released, or removed.

According to an exemplary embodiment of the present disclosure, when it is determined that the fifth object 720*b* is to be maintained displayed, the processor may delete the fourth object 720*a*, in the state that the fifth object 720*b* is displayed.

Figure 8F:
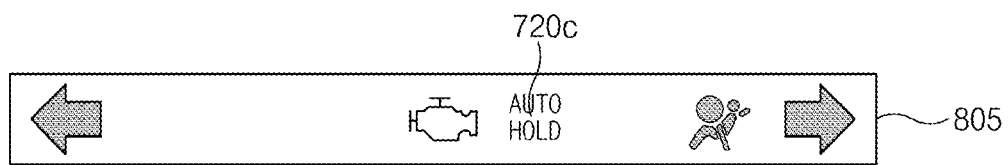

Referring to FIG. 8F, according to an exemplary embodiment of the present disclosure, in the display control device of the vehicle cluster and the method for the same, when an event corresponding to a sixth object 720*c* is determined as occurring, the processor may display the sixth object 720*c* at a position, which is set to have the third highest priority, of the plurality of positions specified in the first area 805.

According to an exemplary embodiment of the present disclosure, when it is determined that the fifth object 720*b* is to be maintained displayed, the processor may display the sixth object 720*c* at a position, which is set to have the third highest priority, of the plurality of positions specified in the first area 805, in the state that the fifth object 720*b* is displayed.

In detail, according to an exemplary embodiment of the present disclosure, in the display control device of the vehicle cluster and the method for the same, when an event corresponding to the sixth object 720*c* is determined as occurring, the processor may display the sixth object 720*c* at a position, which is set to have the third highest priority, instead of a position set to have the highest priority, based on the position information stored in the memory, even when a position, which is set to have the highest priority, of the plurality of positions specified in the first area 805 is empty.

According to an exemplary embodiment of the present disclosure, the processor may store, in the memory, information on a position at which the sixth object 720*c* is displayed. For example, the information on the position, at which the sixth object 720*c* is displayed, may include information on a position, which is allocated or specified for the sixth object 720*c*, of the plurality of positions specified in the first area 805.

Figure 8G:
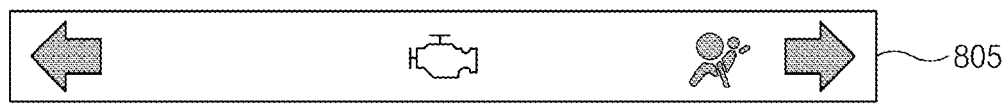

Referring to FIG. 8G, according to an exemplary embodiment of the present disclosure, in the display control device of the vehicle cluster and the method for the same, when it is determined that the displaying of the sixth object 720*c* is released or the sixth object 720*c* displayed is deleted, the processor may release the displaying of the sixth object 720*c* in the first area 805 or may delete the sixth object 720*c* displayed from the first area 805.

For example, the processor may release the displaying of the sixth object 720*c* in the first area 805 or delete the sixth object 720*c* displayed from the first area 805, when it is determined that the event corresponding to the sixth object 720*c* is terminated, released, or removed.

According to an exemplary embodiment of the present disclosure, when it is determined that the fifth object 720*b* is to be maintained displayed, the processor may delete the sixth object 720*c*, in the state that the fifth object 720*b* is displayed.

Figure 8H:
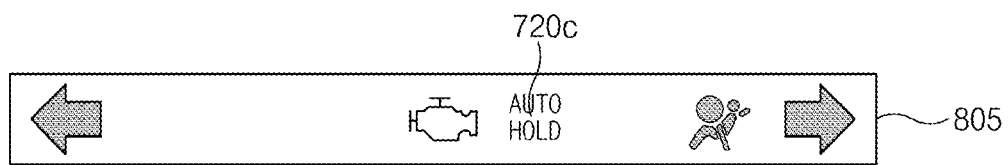

Referring to FIG. 8H, according to an exemplary embodiment of the present disclosure, in the display control device of the vehicle cluster and the method for the same, when an event corresponding to the sixth object 720*c* is determined as occurring, the processor may display the sixth object 720*c* at a position, which is set to have the third highest priority, of the plurality of positions specified in the first area 805, based on the position information stored in the memory.

According to an exemplary embodiment of the present disclosure, when an event corresponding to the sixth object 720c is determined as occurring, the processor may display the sixth object 720c at a position, which is set to have the third highest priority, instead of a position set to have the highest priority, based on the position information stored in the memory, even when the position, which is set to have the highest priority, of the plurality of positions specified in the first area 805 is empty.

FIG. 9A, FIG. 9B, FIG. 9C, and FIG. 9D are views exemplarily illustrating that an object, which corresponds to an event occurring during a second driving cycle, is displayed on a display provided in a vehicle cluster, in a display control device of the vehicle cluster and a method for the same, according to an exemplary embodiment of the present disclosure.

Referring to FIG. 9A, FIG. 9B, FIG. 9C, and FIG. 9D, the first area 805 may be placed in at least a partial area of a display provided in a cluster. For example, the first area 805 may include an upper central area of the display. According to an exemplary embodiment of the present disclosure, the object for indicating the information on the state of the vehicle or the information on the driving of the vehicle may be displayed in the first area 805.

According to an exemplary embodiment of the present disclosure, the processor may store, in the memory, information on a position, at which the object is displayed, when the object for indicating the information on the state of the vehicle or the information on the driving of the vehicle is displayed in the first area 805.

According to an exemplary embodiment of the present disclosure, when the event occurs during the second driving cycle and the object corresponding to the event is displayed in the first area 805, the processor may display the object based on the information on the position stored in the memory.

According to an exemplary embodiment of the present disclosure, when the event occurring during the second driving cycle is the same as the event occurring during the first driving cycle, the processor may display the object corresponding to the event occurring during the second driving cycle at a position the same as a position, at which the object corresponding to the event occurring during the first driving cycle is displayed, of the plurality of positions specified in the first area 805.

According to an exemplary embodiment of the present disclosure, when the event occurring during the second driving cycle is different from the event occurring during the first driving cycle, the processor may display the object corresponding to the event occurring during the second driving cycle, at a position different from a position, at which the object corresponding to the event occurring during the first driving cycle is displayed, of the plurality of positions specified in the first area 805. In the instant case, the object corresponding to the event occurring during the second driving cycle may be sequentially displayed at the plurality of positions specified in the first area, while first displayed at the position, which has a higher priority, of the plurality of positions specified in the first area 805, depending on the sequence in which the event occurs.

Figure 9A:
FIG. 9A, FIG. 9B, FIG. 9C, and FIG. 9D are views exemplarily illustrating that an object, which corresponds to an event occurring during a second driving cycle, is displayed on a display provided in a cluster for a vehicle, in a device configured for controlling displaying of the cluster for the vehicle and a method for the same, according to an exemplary embodiment of the present disclosure.

Referring to FIG. 9A, according to an exemplary embodiment of the present disclosure, in the display control device of the vehicle cluster and the method for the same, the processor may allocate or specify, one by one, the plurality of positions specified in the first area 805 to an object (e.g., the fourth object 720a, the fifth object 720b, and the sixth object 720c of FIG. 8), which is displayed at least one time during the first driving cycle, based on the position information stored in the memory.

Figure 9B:
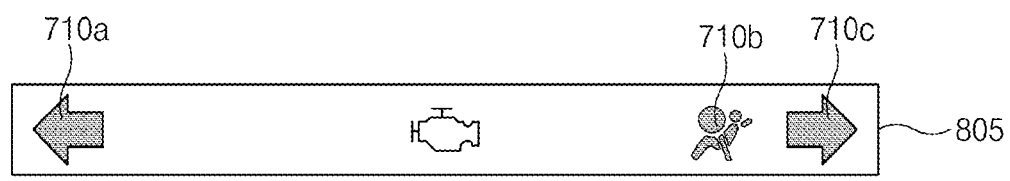

Referring to FIG. 9B, according to an exemplary embodiment of the present disclosure, the processor may display the object corresponding to the specific event at a fixed area of the first area 805 regardless of the sequence in which the event occurs.

According to an exemplary embodiment of the present disclosure, the object corresponding to the specific event may include an object (e.g., the first object 710a, the second object 710b, and the third object 710c), which may be displayed at a specified position of the display in compliance with a relevant regulation.

For example, when the information corresponding to the first object 710a is determined to be displayed, the processor may display the first object 710a at a first fixed position of the first area 805. For example, when the information corresponding to the second object 710b is determined to be displayed, the processor may display the second object 710b at a second fixed position of the first area 805. Furthermore, for example, when the information corresponding to the third object 710c is determined to be displayed, the processor may display the third object 710c at a third fixed position of the first area 805.

Figure 9C:
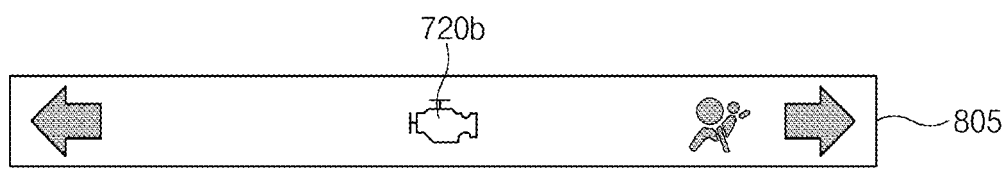

Referring to FIG. 9C, according to an exemplary embodiment of the present disclosure, in the display control device of the vehicle cluster and the method for the same, the processor may display the fifth object 720b at the position the same as the position in which the fifth object 720b is displayed during a right-before driving cycle (e.g., the first driving cycle), based on the position information stored in the memory, when the event corresponding to the fifth object 720b is determined as occurring during the second driving cycle. In the instant case, the fifth object 720b may be an object corresponding to an event occurring during the right-before driving cycle (e.g., the first driving cycle).

According to an exemplary embodiment of the present disclosure, the processor may display the fifth object 720b at the position, which is allocated to the fifth object 720b, of the plurality of positions specified in the first area 805, based on the position information stored in the memory.

Figure 9D:
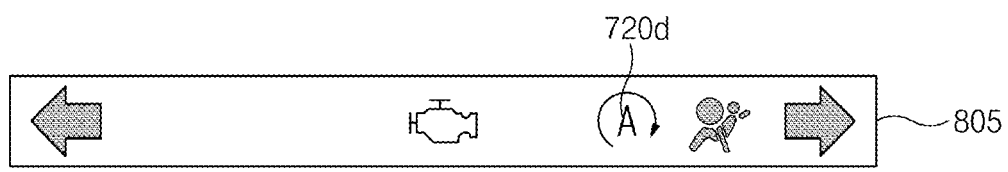

Referring to FIG. 9D, according to an exemplary embodiment of the present disclosure, in the display control device of the vehicle cluster and the method for the same, the processor may display a seventh object 720d at a position at which any object is not displayed during a right-before driving cycle (e.g., the first driving cycle), when the event corresponding to the seventh object 720b is determined as occurring. In the instant case, the seventh object 720d may be an object corresponding to an event which does not occur during the right-before driving cycle (e.g., the second driving cycle).

According to an exemplary embodiment of the present disclosure, when the fifth object 720b is determined to be maintained displayed, the processor may display the seventh object 720d at the position at which any object is not displayed during a right-before driving cycle (e.g., the first driving cycle), in the state that the fifth object 720b is displayed.

According to an exemplary embodiment of the present disclosure, when the event corresponding to the seventh object 720d is determined as occurring, the processor may display the seventh object 720d at a position, which has the highest priority, of positions, which are not allocated to any object, of the plurality of positions specified in the first area 805, based on the position information stored in the memory.

FIG. 10A, FIG. 10B, FIG. 10C and FIG. 10D are views exemplarily illustrating that an object, which corresponds to an event occurring during a third driving cycle, is displayed on a display provided in a vehicle cluster, in a display control device of the vehicle cluster and a method for the same, according to an exemplary embodiment of the present disclosure.

Referring to FIG. 10A, FIG. 10B, FIG. 10C and FIG. 10D, the first area 805 may be placed in at least a partial area of a display provided in a cluster. For example, the first area 805 may include an upper central area of the display. According to an exemplary embodiment of the present disclosure, the object for indicating the information on the state of the vehicle or the information on the driving of the vehicle may be displayed in the first area 805.

According to an exemplary embodiment of the present disclosure, the processor may store, in the memory, information on a position, at which the object is displayed, when the object for indicating the information on the state of the vehicle or the information on the driving of the vehicle is displayed in the first area 805.

According to an exemplary embodiment of the present disclosure, when the event occurs during the third driving cycle and the object corresponding to the event is displayed in the first area 805, the processor may display the object based on the information on the position stored in the memory.

According to an exemplary embodiment of the present disclosure, when the event occurring during the third driving cycle is different from the event occurring during the second driving cycle, the processor may display the object corresponding to the event occurring during the third driving cycle, at a position different from a position, at which the object corresponding to the event occurring during the second driving cycle is displayed, of the plurality of positions specified in the first area 805. In the instant case, the object corresponding to the event occurring during the third driving cycle may be sequentially displayed at the plurality of positions specified in the first area 805, while first displayed at the position, which has a higher priority, of the plurality of positions specified in the first area 805, depending on the sequence in which the event occurs.

Figure 10A:
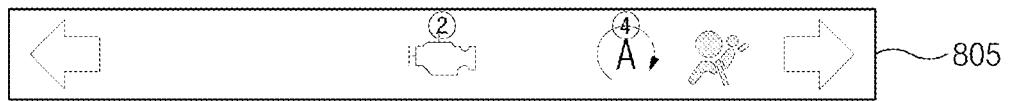
FIG. 10A, FIG. 10B, FIG. 10C and FIG. 10D are views exemplarily illustrating that an object, which corresponds to an event occurring during a third driving cycle, is displayed on a display provided in a cluster for a vehicle, in a device configured for controlling displaying of the cluster for the vehicle and a method for the same, according to an exemplary embodiment of the present disclosure.

Referring to FIG. 10A, according to an exemplary embodiment of the present disclosure, in the display control device of the vehicle cluster and the method for the same, the processor may allocate or specify, one by one, the plurality of positions specified in the first area 805 to an object (e.g., the fifth object 720b, and the seventh object 720d of FIG. 9), which is displayed at least one time during the second driving cycle, based on the position information stored in the memory.

Figure 10B:
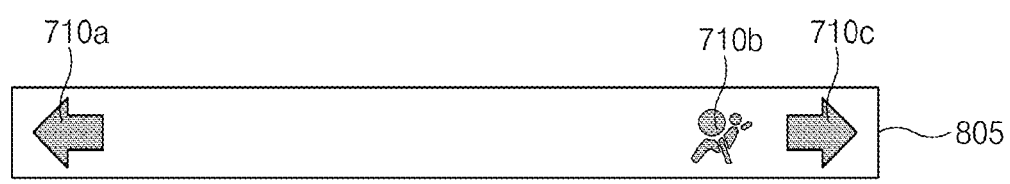

Referring to FIG. 10B, according to an exemplary embodiment of the present disclosure, the processor may display the object corresponding to the specific event at a fixed area of the first area 805 regardless of the sequence in which the event occurs.

According to an exemplary embodiment of the present disclosure, the object corresponding to the specific event may include an object (e.g., the first object 710a, the second object 710b, and the third object 710c), which may be displayed at a specified position of the display in compliance with a relevant regulation.

For example, when the information corresponding to the first object 710a is determined to be displayed, the processor may display the first object 710a at a first fixed position of the first area 805. For example, when the information corresponding to the second object 710b is determined to be displayed, the processor may display the second object 710b at a second fixed position of the first area 805. Furthermore, for example, when the information corresponding to the third object 710c is determined to be displayed, the processor may display the third object 710c at a third fixed position of the first area 805.

Figure 10C:
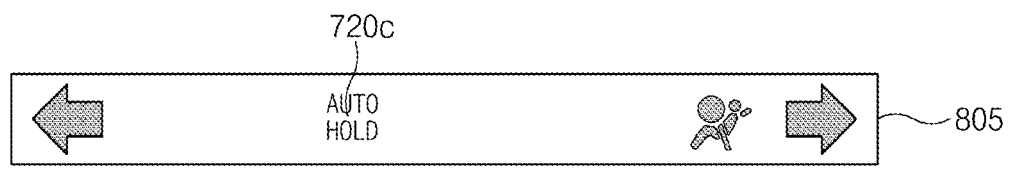

Referring to FIG. 10C, according to an exemplary embodiment of the present disclosure, in the display control device of the vehicle cluster and the method for the same, the processor may display the sixth object 720c at a position at which any object is not displayed during a right-before driving cycle (e.g., the second driving cycle), when the event corresponding to the sixth object 720c is determined as occurring during the third driving cycle. In the instant case, the sixth object 720c may be an object corresponding to an event which does not occur during the right-before driving cycle (e.g., the second driving cycle).

According to an exemplary embodiment of the present disclosure, when the event corresponding to the sixth object 720c is determined as occurring during the third driving cycle, the processor may display the sixth object 720c at a position, which has the highest priority, of positions, which are not allocated to any object, of the plurality of positions specified in the first area 805, based on the position information stored in the memory.

Figure 10D:
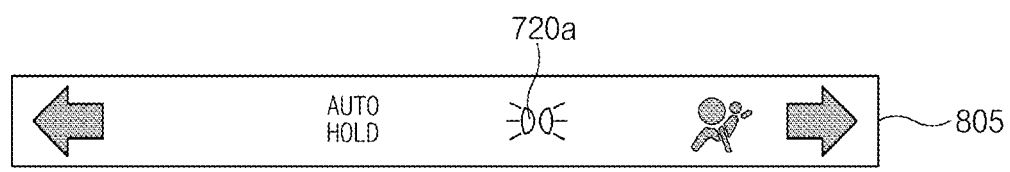

Referring to FIG. 10D, according to an exemplary embodiment of the present disclosure, in the display control device of the vehicle cluster and the method for the same, the processor may display the fourth object 720a at a position at which any object is not displayed during a right-before driving cycle (e.g., the second driving cycle), when the event corresponding to the fourth object 720c is determined as occurring during the third driving cycle. In the instant case, the fourth object 720a may be an object corresponding to an event which does not occur during the right-before driving cycle (e.g., the second driving cycle).

According to an exemplary embodiment of the present disclosure, in the display control device of the vehicle cluster and the method for the same, when the event corresponding to the fourth object 720a is determined as occurring during the third driving cycle, the processor may display the fourth object 720a at a position, which has the second higher priority, of positions, which are not allocated to any object, of the plurality of positions specified in the first area 805, based on the position information stored in the memory.

FIG. 11A, FIG. 11B, FIG. 11C, and FIG. 11D are views exemplarily illustrating that some of objects in a second area of a display provided in a vehicle cluster are displayed in a first area, in a display control device of the vehicle cluster and a method for the same, according to an exemplary embodiment of the present disclosure.

Figure 11A:
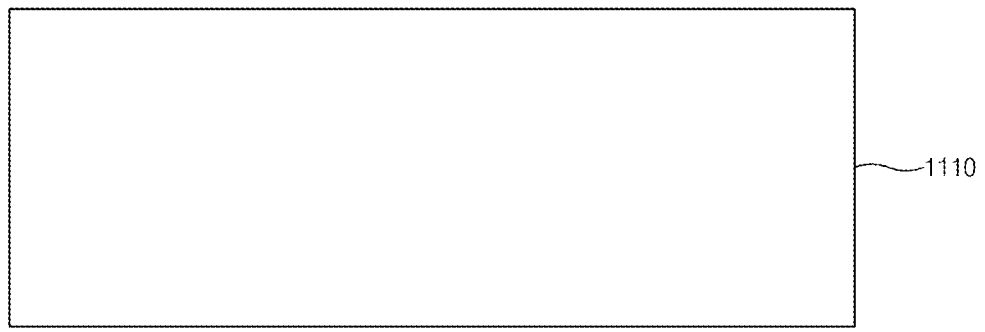
FIG. 11A, FIG. 11B, FIG. 11C, and FIG. 11D are views exemplarily illustrating that some of objects in a second area of a display provided in a vehicle cluster are displayed in a first area, in a device configured for controlling displaying of the cluster for the vehicle and a method for the same, according to an exemplary embodiment of the present disclosure.

FIG. 11A illustrates the state of a display 1110 before power is applied to the vehicle. For example, FIG. 11A illustrates the state of the display 1110 in an ignition off (IG OFF) of a vehicle.

Figure 11B:
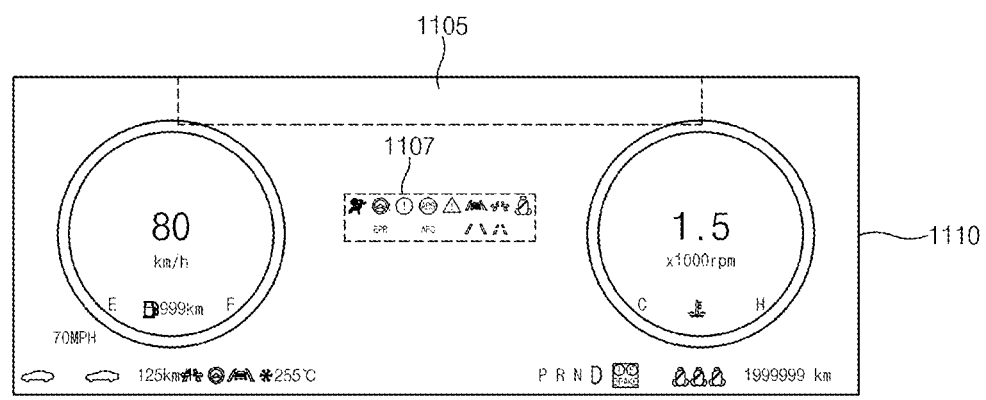

FIG. 11B illustrates the state of the display 1110, when power is applied to a vehicle, in a display control device of a vehicle cluster and a method for the same, according to an exemplary embodiment of the present disclosure. For example, FIG. 11B illustrates the state of the display 1110 in an ignition on (IG ON) state of a vehicle.

According to an exemplary embodiment of the present disclosure, a first area 1105 and a second area 1107 may be provided in at least a partial area of the display 1110.

According to an exemplary embodiment of the present disclosure, the first area 1105 may refer to an area in which information for indicating at least one of the state of the vehicle or the driving state of the vehicle is displayed.

According to an exemplary embodiment of the present disclosure, the first area 1105 may include an upper central area of the display 1110.

According to an exemplary embodiment of the present disclosure, the second area 1107 may refer to an area for displaying an object for indicating a system operating state, when power is supplied to the vehicle. According to an exemplary embodiment of the present disclosure, the second area 1107 may include the central area under the first area 1105.

Referring to FIG. 11B, according to an exemplary embodiment of the present disclosure, in the display control device of the vehicle cluster and the method for the same, the processor may display the object for indicating the system operating state in the second area 1107, when the power is supplied to the vehicle.

For example, the object for indicating the system operating state may include at least one of information on a state of the vehicle, information on driving of the vehicle, a notification and/or a warning message.

As described above, according to an exemplary embodiment of the present disclosure, the display control device of the present disclosure may provide a warning function or a guiding function such that a driver recognizes the state of the vehicle, by turning on or off the lighting of at least one object for indicating the system operating state in the central area of the display.

Figure 11C:
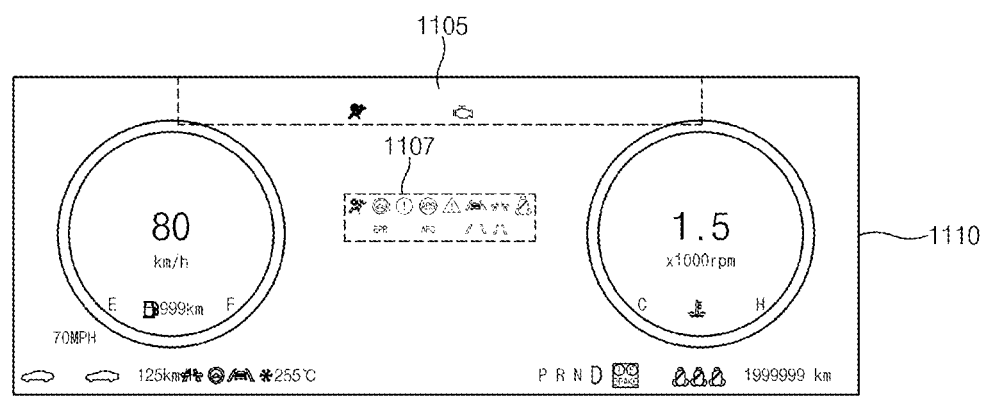

Referring to FIG. 11C, according to an exemplary embodiment of the present disclosure, in the display control device of the vehicle cluster and the method for the same, the processor may display, in the first area 1105, an object, which is to be maintained displayed, of the at least one object for indicating the system operating state, after a specific time is elapsed from the displaying of the at least one object for indicating the system operating state.

According to an exemplary embodiment of the present disclosure, the processor may apply an animation to the object, which is to be maintained displayed, of the at least one object for indicating the system operating state, after a specific time is elapsed from the displaying of the at least one object for indicating the system operating state in the second area 1107, and may move the object, which is to be maintained displayed, to the first area 1105.

According to an exemplary embodiment of the present disclosure, the animation effect may be previously stored in the memory.

Figure 11D:
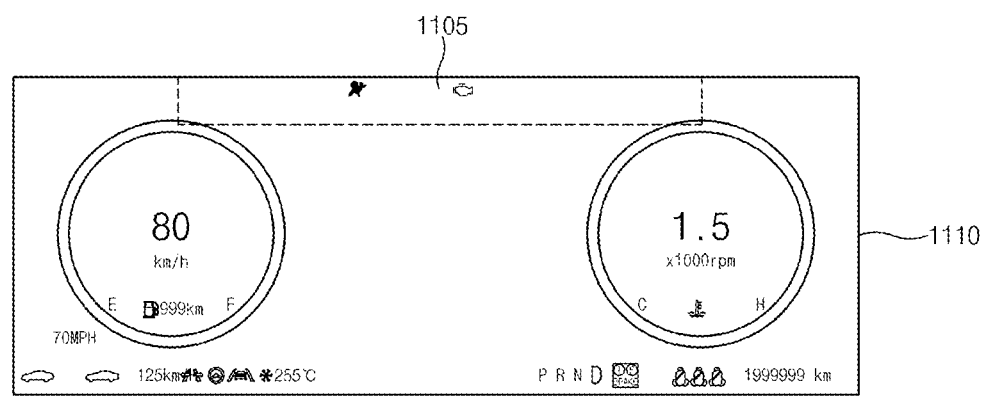

Referring to FIG. 11D, according to an exemplary embodiment of the present disclosure, in the display control device of the vehicle cluster and the method for the same, when the object moved from the second area 1107 is determined to be consecutively displayed, after the specific time is elapsed from the supplying of power to the vehicle, the processor may display the moved object in the first area 1105 until it is determined that the displaying of the object is released.

Figure 12:
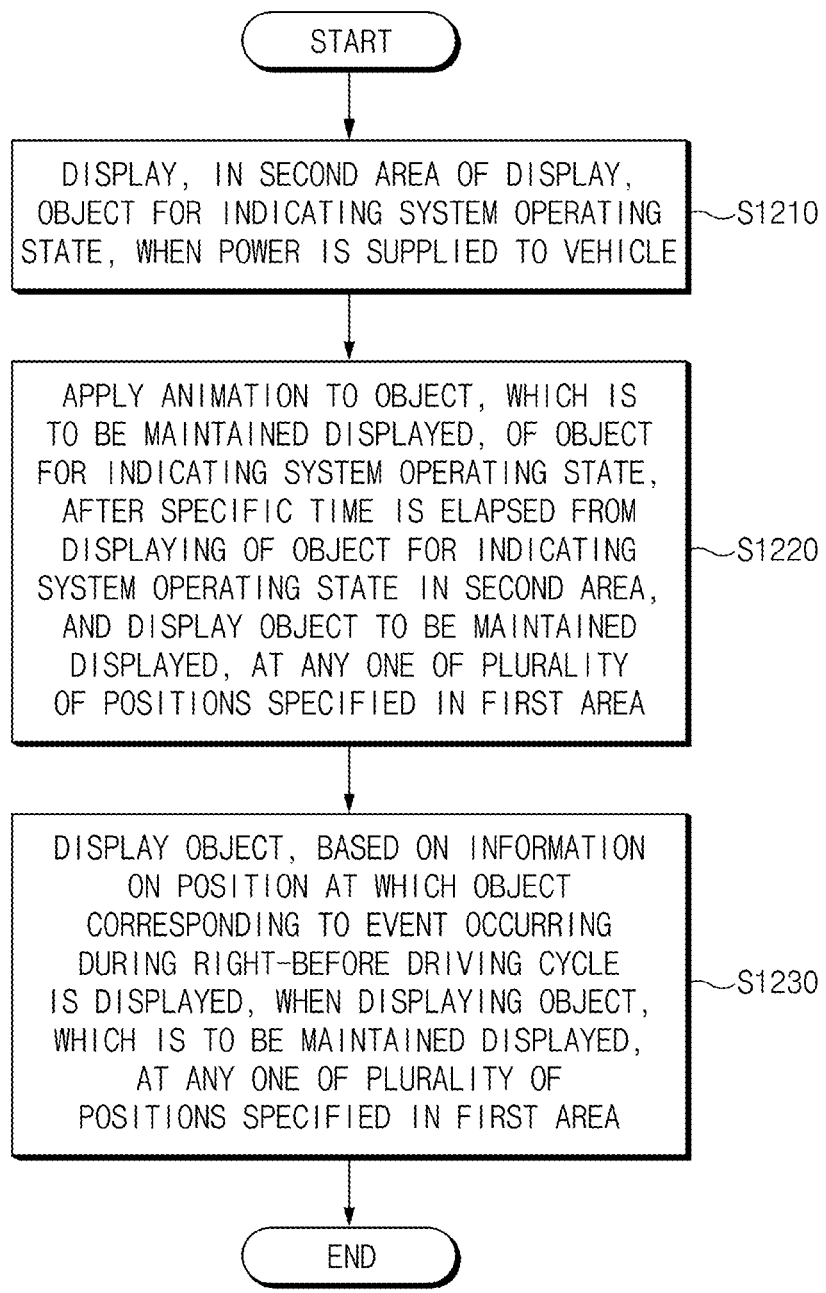
FIG. 12 is a flowchart illustrating that some of objects in a second area of a display provided in a cluster for a vehicle are displayed in a first area, in a device configured for controlling displaying of the cluster for the vehicle and a method for the same, according to an exemplary embodiment of the present disclosure.

FIG. 12 is a flowchart illustrating that some of objects in a second area of a display provided in a cluster for a vehicle are displayed in a first area, in a device configured for controlling displaying of the cluster for the vehicle and a method for the same, according to an exemplary embodiment of the present disclosure. In the following description to be made with reference to FIG. 2, the duplication of the above description will be briefly described or omitted.

Referring to FIG. 12, in the display control device of the vehicle cluster and the method for the same, according to an exemplary embodiment of the present disclosure, the processor may display, in the second area of the display, an object for indicating a system operating state, when power is supplied to the vehicle (S1210).

According to an exemplary embodiment of the present disclosure, the second area may include the central area of the display.

As described above, according to an exemplary embodiment of the present disclosure, the display control device of the present disclosure may provide a warning function or a guiding function such that a driver recognizes the state of the vehicle in advance before driving, by turning on or off the lighting of at least one object for indicating the system operating state in the central area of the display.

According to an exemplary embodiment of the present disclosure, the processor may apply an animation to an object, which is to be maintained displayed, of the object for indicating the system operating state, after a specific time is elapsed from displaying of the object for indicating the system operating state in the second area, and may display the object to be maintained displayed, at any one of the plurality of positions specified in the first area (S1220).

According to an exemplary embodiment of the present disclosure, the processor may apply an animation in which an object, which is to be maintained displayed, of an object for indicating a system operating state is moved to the first area after a specific time is elapsed from displaying of the object for indicating the system operating system in the second area.

According to an exemplary embodiment of the present disclosure, the object moved to the first area may be displayed at any one of a plurality of positions specified in the first area.

According to an exemplary embodiment of the present disclosure, when displaying the object, which is to be maintained displayed, at any one of the plurality of positions specified in the first area, the processor may display the object, based on the information on a position at which an object corresponding to an event occurring during the right-before driving cycle is displayed (S1230).

According to an exemplary embodiment of the present disclosure, when the event corresponding to the object which is to be maintained displayed is the same as an event occurring during the right-before driving cycle, the processor may display the object which is to be maintained displayed, at a position the same as a position, at which an object corresponding to the event occurring during the right-before driving cycle is displayed.

According to an exemplary embodiment of the present disclosure, when the event corresponding to the object which is to be maintained displayed is different from an event occurring during the right-before driving cycle, the processor may display the object which is to be maintained displayed, at a position different from a position, at which an object corresponding to the event occurring during the right-before driving cycle is displayed. According to an exemplary embodiment of the present disclosure, the processor may display the object, which is to be maintained displayed, at any one of the plurality of positions specified in the first area, in the sequence in which the event occurs.

Figure 13:
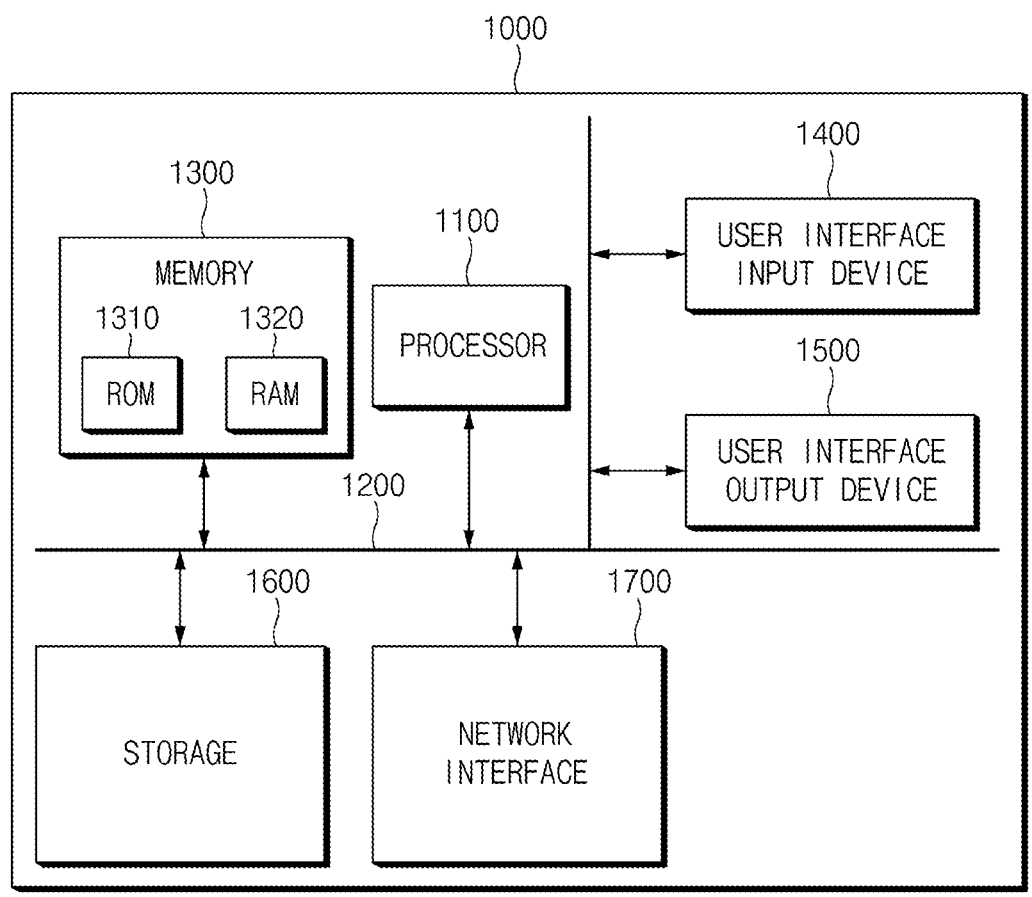
FIG. 13 illustrates a computing system for a device configured for controlling displaying of a cluster for a vehicle and a method for the same, according to an exemplary embodiment of the present disclosure.

FIG. 13 illustrates a computing system for a display control device of a vehicle cluster and a method for the same, according to an exemplary embodiment of the present disclosure.

Referring to FIG. 13, a computing system 1000 for a display control device of a vehicle cluster and a method for the same may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an exemplary embodiment of the present disclosure, a device configured for controlling displaying of a cluster for a vehicle and a method for the same have the following effects.

According to at least one of embodiments of the present disclosure, the information on the state of the vehicle or the information on the driving of the vehicle may be displayed at the upper center portion of the large-scale display provided in the cluster, improving the visibility of the driver.

Furthermore, according to at least one of embodiments of the present disclosure, the external area of the cluster may be freely used by centralizing an area for displaying the information on the state of the vehicle or the information on the driving of the vehicle.

Furthermore, according to at least one of embodiments of the present disclosure, the screen burn-in phenomenon may be improved by changing the position for displaying the information which is to be displayed in the same shape or in the same color at a fixed position.

Furthermore, according to at least one of embodiments of the present disclosure, the information, which is frequently used, is provided at the upper central area of the display, improving the usability of the display.

Besides, a variety of effects directly or indirectly understood through the present disclosure may be provided.

The above description is merely an example of the technical idea of the present disclosure, and various modifications and modifications may be made by one skilled in the art without departing from the essential characteristic of the present disclosure.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A apparatus for controlling displaying of a cluster for a vehicle, the apparatus comprising:
 a communication apparatus configured to support communication with the cluster for the vehicle; and
 at least one processor operatively connected to the communication apparatus,
 wherein the at least one processor is configured to:
  generate screen data associated with a first event occurring during a first driving cycle of the vehicle;
  transmit the screen data to the cluster through the communication apparatus; and
  display, in a first area of a display device provided in the cluster, at least one of an object corresponding to the first event, based on the screen data, or an object corresponding to a second event occurring during a second driving cycle next to the first driving cycle, or any combination thereof, and
 wherein the object corresponding to the first event is displayed at one of a plurality of positions specified in the first area, in sequence in which the first event occurs, and
 wherein the at least one processor is configured to display the object corresponding to the second event at a position, which is different from the position at which the object corresponding to the first event is displayed, of the plurality of positions, in sequence in which the second event occurs, when the second event is different from the first event.

2. The apparatus of claim 1, further including:
 a memory operatively connected to the at least one processor,
 wherein the at least one processor is configured to store, in the memory, information on the position at which the object corresponding to the first event is displayed.

3. The apparatus of claim 2, wherein the at least one processor is configured to display, at one of the plurality of positions, the object corresponding to the second event occurring during the second driving cycle next to the first driving cycle, based on the information stored in the memory.

4. The apparatus of claim 3, wherein the at least one processor is configured to display the object corresponding to the second event at a position a same as the position at which the object corresponding to the first event is displayed, when the second event is a same event as the first event.

5. The apparatus of claim 1, wherein the first area includes an upper central area of the display device provided in the cluster.

6. The apparatus of claim 1, wherein the plurality of positions in the first area are previously determined based on a preset priority.

7. The apparatus of claim 1,
wherein the at least one processor is configured to display, in a second area of the display device, an object for indicating a system operating state of the vehicle, when power is supplied to the vehicle, and
wherein the second area includes a central area under the first area.

8. The apparatus of claim 7, wherein the at least one processor is configured to:
apply an animation to an object, which is to be maintained displayed, of the object for indicating the system operating state, after a predetermined time is elapsed from displaying of the object for indicating the system operating state in the second area; and
display the object to be maintained displayed at one of the plurality of positions.

9. The apparatus of claim 1, wherein the object corresponding to the first event includes:
at least one of information on a state of the vehicle or information on driving of the vehicle.

10. The apparatus of claim 1, wherein the at least one processor is configured to:
display an object corresponding to a predetermined event at a fixed position of the first area, regardless of sequence in which the predetermined event occurs, when the predetermined event occurs.

11. A method for controlling displaying of a cluster for a vehicle, the method comprising:
generating, by at least one processor operatively connected to a communication apparatus, screen data associated with a first event occurring during a first driving cycle of the vehicle;
transmitting, through the communication apparatus, the screen data to the cluster for the vehicle; and
displaying, by the at least one processor, in a first area of a display device provided in the cluster, at least one of an object corresponding to the first event, based on the screen data, or an object corresponding to a second event occurring during a second driving cycle next to the first driving cycle, or any combination thereof, and
wherein the object corresponding to the first event is displayed at one of a plurality of positions specified in the first area, in sequence in which the first event occurs, and
wherein the displaying, by the at least one processor, in the first area of the display device provided in the cluster, the at least one of the object corresponding to the first event based on the screen data, or the object corresponding to the second event occurring during the second driving cycle next to the first driving cycle, or any combination thereof, includes:
displaying, by the at least one processor, the object corresponding to the second event at a position, which is different from the position at which the object corresponding to the first event is displayed, of the plurality of positions, in sequence in which the second event occurs when the second event is different from the first event.

12. The method of claim 11, further including:
storing, by the at least one processor, information on the position at which the object corresponding to the first event is displayed, in a memory operatively connected to the at least one processor.

13. The method of claim 12, further including:
displaying, by the at least one processor, the object corresponding to the second event occurring during the second driving cycle next to the first driving cycle, based on the information stored in the memory, at one of the plurality of positions.

14. The method of claim 13, wherein the displaying, by the at least one processor, in the first area of the display device provided in the cluster, the at least one of the object corresponding to the first event based on the screen data, or the object corresponding to the second event occurring during the second driving cycle next to the first driving cycle, or any combination thereof includes:
displaying, by the at least one processor, the object corresponding to the second event at a position a same as the position at which the object corresponding to the first event is displayed when the second event is a same event as the first event.

15. The method of claim 11, wherein the first area includes an upper central area of the display device provided in the cluster.

16. The method of claim 11, wherein the plurality of positions in the first area are previously determined based on a preset priority.

17. The method of claim 11, further including:
displaying, by the at least one processor, an object for indicating a system operating state of the vehicle, when power is supplied to the vehicle, in a second area of the display device,
wherein the second area includes a central area under the first area.

18. The method of claim 17, further including:
applying, by the at least one processor, an animation to an object, which is to be maintained displayed, of the object for indicating the system operating state, after a predetermined time is elapsed from displaying of the object for indicating the system operating state in the second area; and
displaying the object to be maintained displayed at one of the plurality of positions.

19. The method of claim 11, wherein the object corresponding to the first event includes at least one of information on a state of the vehicle or information on driving of the vehicle.

20. The method of claim 11, further including:
displaying, by the at least one processor, an object corresponding to a predetermined event at a fixed position of the first area, regardless of sequence in which the predetermined event occurs, when the predetermined event occurs.

* * * * *